United States Patent
Sutter et al.

(10) Patent No.: US 7,058,537 B2
(45) Date of Patent: Jun. 6, 2006

(54) METHOD AND DEVICE FOR DETECTING A ROTATIONAL SPEED COMPRISING AN ESTIMATION OF A MEASURED VALUE AT LOW ROTATIONAL SPEEDS

(75) Inventors: Joerg Sutter, Gaggenau (DE); Heiko Frey, Kuppenheim (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 10/502,614

(22) PCT Filed: May 6, 2003

(86) PCT No.: PCT/DE03/01439

§ 371 (c)(1),
(2), (4) Date: Jul. 27, 2004

(87) PCT Pub. No.: WO03/100443

PCT Pub. Date: Dec. 4, 2003

(65) Prior Publication Data

US 2005/0171724 A1 Aug. 4, 2005

(30) Foreign Application Priority Data

May 24, 2002 (DE) .............................. 102 23 140
Jun. 20, 2002 (DE) .............................. 102 27 523

(51) Int. Cl.
*G06F 15/00* (2006.01)

(52) U.S. Cl. .................. 702/150; 702/145; 702/148; 702/151

(58) Field of Classification Search ................ 702/127, 702/141, 142, 145, 147, 148, 104, 176, 186, 702/187, 150, 151
See application file for complete search history.

(56) References Cited

U.S. PATENT DOCUMENTS 4,305,370 A * 12/1981 Hohne ................... 123/406.59
4,885,710 A * 12/1989 Hersberger et al. ......... 702/146

FOREIGN PATENT DOCUMENTS

EP 0341445 * 11/1989
EP 0401757 * 12/1990

* cited by examiner

*Primary Examiner*—Bryan Bui
(74) *Attorney, Agent, or Firm*—Ronald E. Greigg

(57) ABSTRACT

An apparatus and a method with which a more-precise indication of an rpm is possible even if a position signal continues to be absent. To that end, a counter state of a counter is evaluated and is set to zero at each position signal. If the expected position signal remains absent for an overly long time, an rpm is estimated on the basis of the counter state of the counter. In this way, an rpm change can rapidly be detected and compensated for.

11 Claims, 2 Drawing Sheets

METHOD AND DEVICE FOR DETECTING A ROTATIONAL SPEED COMPRISING AN ESTIMATION OF A MEASURED VALUE AT LOW ROTATIONAL SPEEDS

CROSS-REFERENCE TO RELATED APPLICATIONS

This application is a 35 USC 371 application of PCT/DE 03/01439 filed on May 6, 2003.

BACKGROUND OF THE INVENTION

1. Field of the Invention

The invention relates to a method of and an apparatus for ascertaining an rpm of an electric motor.

2. Description of the Prior Art

In many fields in technology, it is necessary to know a precise rpm or a precise rotary position of a motor. With direct current motors, for instance, it is known to detect the rpm, and various methods are used for this. One inexpensive variant is to calculate the rpm with the aid of Hall sensors; a Hall sensor detects the position of a rotor and sends that onward to a control unit. The Hall sensors react to the magnetic field of the rotating rotor, which is made of a magnetic material. For calculating the rpm, the time between two edges of a Hall signal is measured, and the rpm is calculated from that.

The object of the invention is to furnish a fast method for ascertaining an rpm and an apparatus for performing the method.

SUMMARY AND ADVANTAGES OF THE INVENTION

One advantage of the method of the invention is that an rpm estimate is made if a signal to be received from a position sensor is delayed. The arrival of a new position signal is delayed whenever the rpm has decreased. To that end, preferably the time that has elapsed since the last position signal and the arrival of the next position signal is measured and compared with the most recently measured rpm. If the time that has elapsed since the last position signal is greater than expected on the basis of the rpm, then the rpm is ascertained from the time that has elapsed since the last position signal.

In this way, it becomes possible to ascertain the rpm precisely and quickly.

In a preferred embodiment, as the elapsed time after which an rpm estimate is made, the difference between two preceding position signals is used. By using the position signals, complicated recalculation is made unnecessary. Thus the method can be performed quickly and requires only little computation power.

In a preferred embodiment, the rpm is calculated at fixed time intervals. Current rpm information is thus furnished on an ongoing basis.

For calculating the elapsed time, a counter is preferably used that at fixed time intervals increases a counter value by a fixed value. Thus the counter state is proportional to the time that has elapsed since the last position signal. Using a counter makes a simple, economical execution of the method of the invention possible.

In a preferred embodiment, an intervention is made into the rpm regulation of the electric motor if the time since the last position signal is longer than it should be on the basis of the most recently measured rpm. The rpm is then estimated on the basis of the time elapsed since the last position signal. In this way, fast and precise regulation of the electric motor is obtained. In particular, this procedure offers a reliable method for obtaining constant rpm regulation in direct current motors with low rotary speeds. Particularly in direct current motors that run at low rotary speeds, torque fluctuations can lead to uneven running of the motor, and the motor can be induced to vibrate. Increasing motor vibration may for instance even cause the motor to stop. The method of the invention reliably avoids these disadvantageous effects.

BRIEF DESCRIPTION OF THE DRAWINGS

The invention is described in further detail below in conjunction with the drawings, in which.

DESCRIPTION OF THE PREFERRED EMBODIMENTS

The invention is described below in terms of a direct current motor 1 but can be used for any type of motor. Preferably, the direct-current motor is used in the form of a pump motor for an electrohydraulic power steering system in a motor vehicle. With the aid of the motor 1, however, any other type of device, in particular in a motor vehicle, can be triggered.

Figure 1:
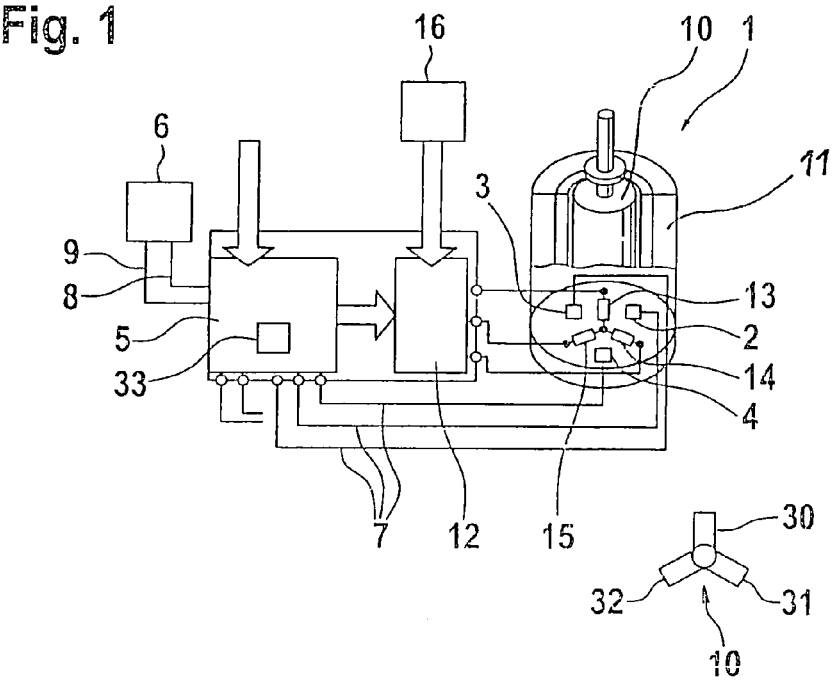
FIG. 1 shows an apparatus according to the invention with a motor.

FIG. 1 schematically shows a commutated motor 1 that is operated with direct current. The motor one has a rotatably supported rotor 10, which in the embodiment shown has three magnetic poles 30, 31, 32, which are spaced apart by 120° from each other. A stator 11 embodied in the form of magnet coils 13, 14, 15 is disposed around the rotor 10. The stator 11 is in communication with an end stage 12 via a supply line. The end stage 12, for triggering the first, second and third magnet coils 13, 14, 15, is connected to a direct voltage source 16. The end stage 12 is connected to a control unit 5 via a control line. First, second and third Hall sensors 2, 3, 4 are also disposed on the motor 1. The first, second and third Hall sensors 2, 3, 4 are disposed around the motor 1 at equidistant angular spacings, and serve to detect the position of the rotor 10. If a magnetic pole 30, 31, 32 of the rotor 10 moves past a Hall sensor 2, 3, 4, then a Hall voltage is generated in the Hall sensor on the basis of the magnetic field of the rotor 10. The Hall voltage is carried onward to the control unit 5 via a signal line 7. Thus the control unit 5, because it knows the angular position of the first, second and third Hall sensor 2, 3, 4 relative to a rotation of the rotor 10, detects the local position of the rotor 10. The control unit 5 furthermore communicates with a counter 6, via a reset line 8 and a second signal line 9.

As a function of the position of the rotor 10, the control unit 5 controls the supply of current to the magnet coils 13, 14, 15 of the stator 11. As a result of the interaction among the magnetic fields that are generated by the magnet coils and the magnetic fields of the rotor 10, the rotor 10 is excited to perform a rotation at a desired rpm.

Figure 2:
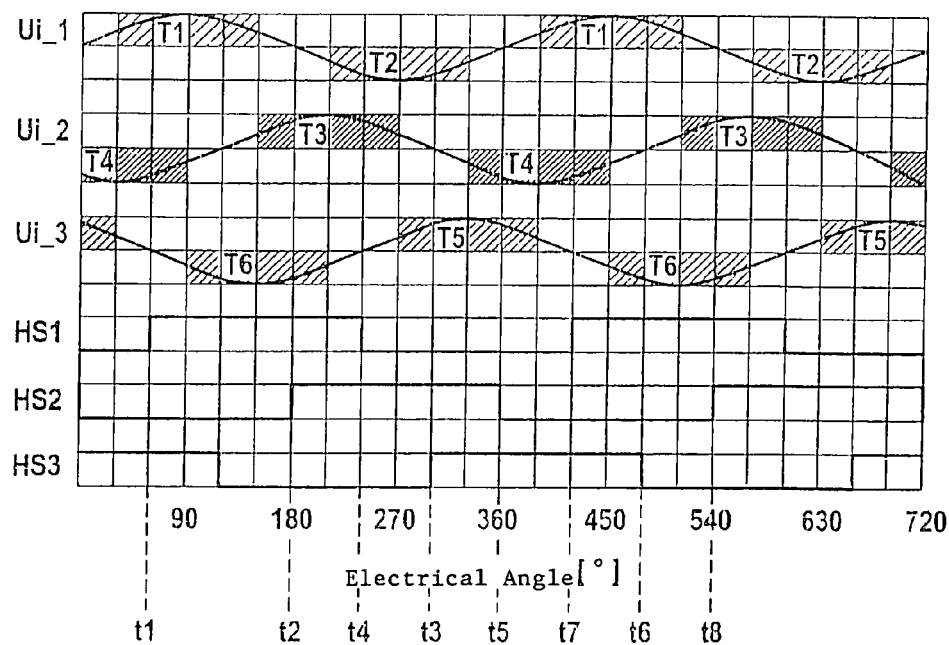
FIG. 2 is a graph that shows Hall signals as a function of the three phase currents.

FIG. 2 shows a graph in which the Hall signals of the Hall sensors 2, 3, 4 are plotted over voltage courses of the first, second and third magnet coils 13, 14, 15. In the graph, Ui1 is a voltage course of the first coil 13, Ui2 is the voltage course of the second coil 14, and Ui3 is the voltage course of the third coil 15. The voltage courses are shown in sinusoidal fashion in FIG. 2 for the sake of greater clarity. Depending on the desired magnetic field, the first, second or third magnet coil 13, 14, 15 is supplied with a current of positive or negative polarity, each via two respective switching transistors T1, T2, T3, T4, T5, T6. In the exemplary embodiment shown, for the sake of simplicity, block commutation are been provided, in which the magnet coils 13, 14, 15 are triggered with a block-shaped current (shaded areas in FIG. 2). However, any other type of triggering method may also be employed, such as sinusoidal commutation. In sinusoidal commutation, the magnet coils 13, 14, 15 are supplied with a clocked current signal that is embodied as essentially sinusoidal.

In the graph in FIG. 2, a first Hall signal HS1 of the first Hall sensor 2, a second Hall signal HS2 of the second Hall sensor 3, and a third Hall signal HS3 of the third Hall sensor 4, which the Hall sensors 2, 3, 4 report to the control unit 5, are shown chronologically parallel to the supply of current to the magnet coils 13, 14, 15. The Hall signals HS1, HS2, HS3 alternate between a low level and a high level in the form of a square wave signal. A low or high level is detected by a Hall sensor 2, 3, 4 if a north or south pole of the rotor 10 is acting on the Hall sensor 2, 3, 4. By means of a circuit that evaluates the Hall signal, the association of a high or low level with the north or south pole can be defined. For instance, the Hall signal of the first Hall sensor 2 jumps from a low level to a high level at time t1, and it jumps from a high level to a low level at time t4. The times are plotted as a function of an electrical angle; an electrical angle of 1080° represents one full revolution of the rotor 10.

Typically, the control unit 5, with the aid of the Hall signals HS1, HS2, HS3, calculates the rpm of the rotor. In the process, the control unit 5 uses the leading or trailing edges, for instance, of a Hall signal HS1, HS2, HS3. The control unit knows that three of the Hall sensors 2, 3, 4 are disposed around the motor 1. Moreover, per revolution of the rotor 10, three Hall signals are generated in each Hall sensor 2, 3, 4. Thus the leading edges of one Hall signal of one Hall sensor have a chronological spacing of 120°, and 360° represents one revolution of the rotor 10.

If the rotor 10 now rotates as a result of appropriate current supplied to the magnet coils 13, 14, 15, then at time t1 a magnet pole of the rotor moves past the first Hall sensor 2. In the first Hall sensor 2, a leading edge of a Hall signal is generated at time t1. This signal is reported to the control unit 5. At time t2, the control unit 5 receives a leading edge of the second Hall sensor 3. At time t3, the control unit 5 receives a report of a leading edge from the third Hall sensor 4. At time t7, a leading edge is again generated in the first Hall sensor 2, and at time t8, a leading edge is again generated in the second Hall sensor 3.

Figure 3:
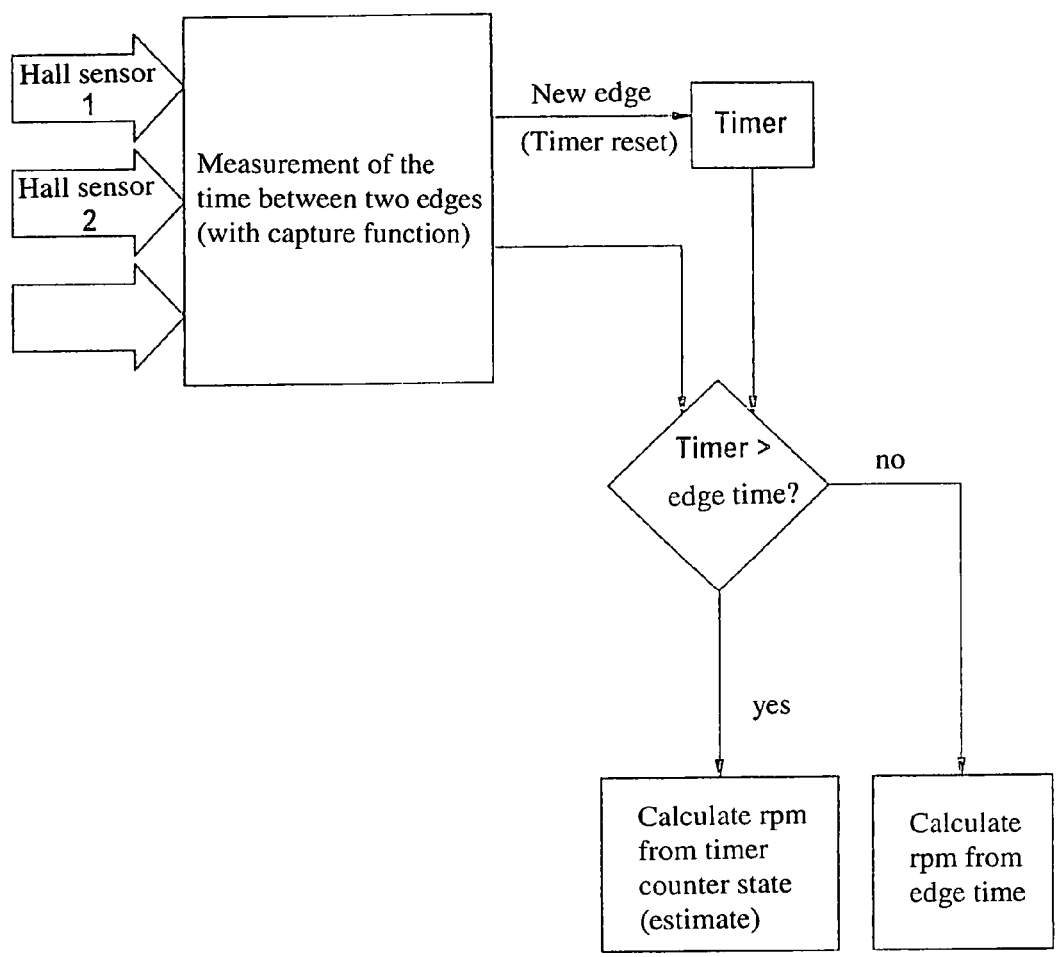
FIG. 3 is a schematic illustration of the method of the invention with the aid of a block diagram.

FIG. 3 is a schematic illustration to explain the method of the invention. The Hall sensors 2, 3, 4 output leading and trailing edges as described of a Hall signal HS1, HS2, HS3 to the control unit 5. With the aid of an internal timer 33, the control unit 5 measures the time that elapses after the detection of a leading or trailing edge of a Hall signal of a Hall sensor 2, 3, 4 until the next leading or trailing edge of the same Hall sensor 2, 3, 4. Via a capture function, the control unit 5 reads out the counter state of the internal timer 33 at a respective leading or trailing edge of the same Hall signal, and from the difference, it calculates the rpm of the rotor.

If the counter state of the internal timer 33 shows a differential value of 8000, for instance, between two leading edges of the same Hall signal, and the internal counter 33 increases its counter state every 2 µs, then between two leading edges of the first Hall signal HS1, a time of 16000 µs has elapsed. During one rotation of the rotor 10, three leading edges are generated in one Hall sensor. The measured time represents one-third of one rotation. The control unit calculates the rpm U by the following formula:

$$U=1/(3\cdot 0.016\ s)=20.833=1/s=1250\ U/\text{min}.$$

Instead of calculating the rpm using the leading edges, the trailing edges of the Hall signals HS1, HS2, HS3 can be used. In the exemplary embodiment shown, the control unit 5 receives a trailing edge of the first Hall signal HS1 at time t4, a trailing edge of the second Hall signal HS2 at time t5, and a trailing edge of the third Hall signal HS3 at time t6. Correspondingly, the control unit 5 calculates the rpm of the motor 1, using the method described above for the leading edges.

The timer 6 runs parallel to this and is always reset when a Hall signal arrives. Upon receiving the leading edge of the first Hall signal HS1 at time t1, the control unit 5 starts the timer 6. The timer 6 increments an internal counter upward at fixed chronological increments. If the control unit 5 at time t2 receives the leading edge of the second Hall sensor HS2, then the control unit 5 stops the timer 6, reads out the counter state, sets the counter state to zero, and starts the timer 6 again. With the timer, independently of the capture function and of the internal timer 33, the elapsed time since the most recent edge of a Hall signal is detected. Since the Hall signals occur with chronological staggering, the counter state of the timer 6 is less, by a factor of six, then the time between two leading or trailing edges of one Hall signal.

If no trailing or leading edge of a Hall signal has arrived, then the most recently calculated rpm is compared by the control unit 5 with the elapsed time since the arrival of the most recent leading or trailing edge. If the elapsed time is greater than it should be on the basis of the most recently calculated rpm, then an rpm calculation is made on the basis of the counter state of the counter 6. This estimation operation is repeated until a leading or trailing edge of a Hall signal is detected, or a time-out signal for likely blocking of the motor arrives.

FIG. 3 shows the mode of operation of the method of the invention, in which at each new edge of a first, second or third Hall signal, the control unit 5 outputs a reset signal to the counter 6 over the reset line 8. The control unit 5 continuously compares whether the counter state of the counter 6 is greater than the chronological spacing of the most recent two leading or trailing edges of a Hall signal.

If the comparison shows that the counter state is greater than the chronological spacing, then the rpm is calculated from the counter state of the timer 6. The timer 6 preferably has a greater chronological pulse rate than the internal counter 33. Preferably, this chronological pulse rate is in the range of 1 ms, after which the timer 6 increases its counter state.

If the comparison shows that the counter state is greater than the chronological spacing of the most recent two leading or trailing edges of the Hall signals, then the following method is performed.

If the counter state of the counter 6 exceeds a predetermined counting time, which time corresponds to the chronological spacing of the last two leading or trailing edges of a Hall signal, then the rpm is estimated on the basis of the counter state of the timer 6, by the following formula:

$U=1/(3 \cdot \text{counter state} \cdot n)$, where n stands for the number of Hall sensors, and the factor of 3 is due to the fact that the rotor has three magnet coils 30, 31, 32.

If the counter state is for instance (0.017/n) s, then the result is an rpm of $1/(3 \cdot 0.017 \text{ s}) = 19.608$ $1/\text{s} = 1176 \text{ } U/\text{min}$.

Thus an estimated rpm is obtained even though no edge signal of the same Hall signal has been detected.

Preferably, the estimation of the rpm is done at fixed chronological spacings, for instance every millisecond. In the instance described, at a counter state of (0.018/n) s, the new rpm, U, is thus calculated:

$U=1/(3 \cdot 0.018 \text{ s}) = 18.519$ $1/\text{s} = 1111 \text{ } U/\text{min}$.

In a corresponding way, an rpm estimate is made every millisecond, until a new capture value for an edge of a Hall signal has been detected, or until a time-out signal appears. Preferably, the control unit 5 compares the time since the last position signal with the most recently measured rpm. If the comparison shows that the time since the last position signal is greater than the time on the basis of which the most recently ascertained rpm was derived, then the rpm is estimated on the basis of the time since the last position signal. In this way, rpm fluctuations or an rpm drop can be reacted to more quickly.

Instead of the Hall sensors 2, 3, 4, other types of position transducers may also be used.

The foregoing relates to preferred exemplary embodiments of the invention, it being understood that other variants and embodiments thereof are possible within the spirit and scope of the invention, the latter being defined by the appended claims.

The invention claimed is:

1. A method for ascertaining an rpm of a drive mechanism (1) comprising an electric motor, in which a position transducer (2, 3, 4) is provided which is disposed in a fixed angular position relative to a rotation of the drive mechanism, in which the position transducer (2, 3, 4) outputs a position signal when the drive mechanism is in a fixed angular position, and in which the position signal is carried to a control unit (5), the control unit (5), from the chronological spacing of the position signals, calculates an rpm of the drive mechanism (1) using an internal timer (33); within a time frame that is defined by a position signal a new position signal is expected by the control unit (5); the time since last the position signal is measured by the control unit (5) using a time counter (6); if the position signal continues to be absent, an rpm of the drive mechanism (1) is ascertained by the control unit (5) on the basis of the counter state of the time counter (6).

2. The method of claim 1, wherein the time frame within which a new position signal is expected is defined as a function of the chronological spacing of the two preceding position signals.

3. The method of claim 1, the rpm is calculated in fixed time intervals using the counter state of the time counter until a new position signal is received.

4. The method of one claim 1, wherein the calculated rpm is compared with a minimum rpm; and wherein an intervention into the regulation of the drive mechanism (1) is made if the minimum rpm is undershot.

5. The method of claim 2, the rpm is calculated in fixed time intervals using the counter state of the time counter until a new position signal is received.

6. The method of one claim 2, wherein the calculated rpm is compared with a minimum rpm; and wherein an intervention into the regulation of the drive mechanism (1) is made if the minimum rpm is undershot.

7. The method of one claim 5, wherein the calculated rpm is compared with a minimum rpm; and wherein an intervention into the regulation of the drive mechanism (1) is made if the minimum rpm is undershot.

8. The method of one claim 3, wherein the calculated rpm is compared with a minimum rpm; and wherein an intervention into the regulation of the drive mechanism (1) is made if the minimum rpm is undershot.

9. An apparatus for ascertaining an rpm of a drive mechanism (1) of an electric motor, comprising a position transducer (2, 3, 4) with a rotor (10), in which a control unit (5) is provided that is connected to the position transducer (1), and the position transducer (1) carries a position signal onward to the control unit (5) when the rotor (10) is in a defined position, the control unit (5) comprises an internal timer (33); the control unit (5) measures the time between two position signals of the position transducer (1); the control unit (5) calculates the rpm using the measured time; the control unit (5) is connected to a counter (6); the control unit (5), on receiving a position signal, sets the counter state of the counter (6) at the value of zero; the counter (6) then increases the counter state at fixed timer intervals; the control unit (5) monitors the arrival of a position signal; and the control unit (5) calculates an rpm on the basis of the counter state of the counter (6) if a position signal is not received within a fixed time frame since the last position signal.

10. An apparatus for ascertaining an rpm of a drive mechanism as recited in claim 11, wherein the pulse rate of the counter (6) is greater than the pulse rate of the internal timer (33).

11. A method for ascertaining an rpm of a drive mechanism (1) comprising an electric motor, in which a position transducer (2, 3, 4) is provided which is disposed in a fixed angular position relative to a rotation of the drive mechanism, in which the position transducer (2, 3, 4) outputs a position signal when the drive mechanism is in a fixed angular position, and in which the position signal is carried to a control unit (5), the control unit (5) comprises an internal timer (33); the control unit (5) measures an elapsed time between two position signals of the position transducer (2, 3, 4); the control unit (5) calculates an rpm of the drive mechanism (1) using the measured time; the control unit (5) is connected with a time counter (6) that is reset and started at each time when a position signal is received; the control unit (5), from the chronological spacing of the position signals, calculates an rpm of the drive mechanism (1); within a time frame that is defined by a predetermined counting time of the time counter (6) that depends on a position signal of a new position signal that is expected by the control unit (5); the time since last the position signal is measured by the control unit (5) using the time counter (6); if the position signal continues to be absent longer as the predetermined counting time of the time counter (6), an rpm of the drive mechanism (1) is ascertained by the control unit (5) on the basis of the counter state of the time counter (6).

* * * * *